Dec. 11, 1928.
G. Y. HARRY
1,694,541
HONEY EXTRACTOR
Filed Sept. 3, 1927
2 Sheets-Sheet 1
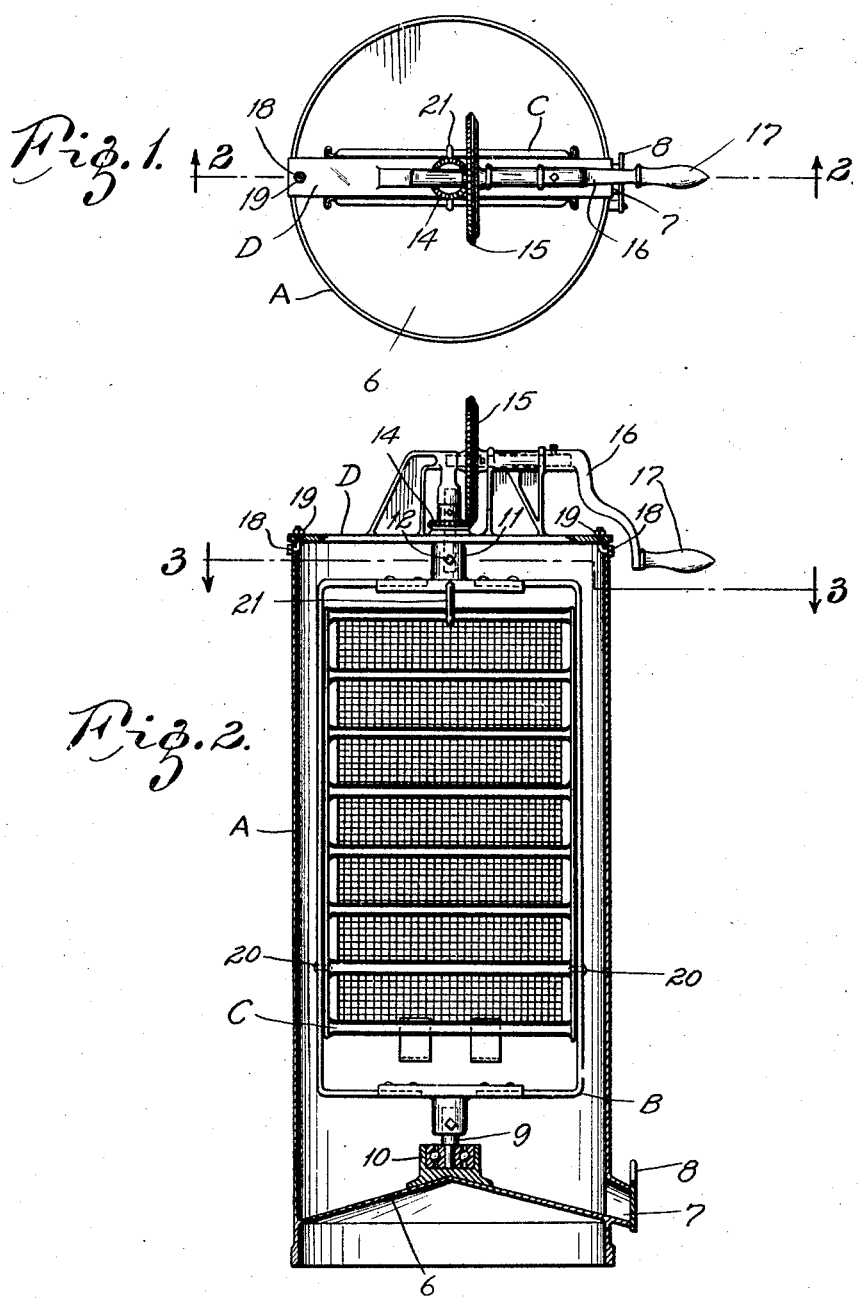
INVENTOR:
GEORGE Y. HARRY.
By James L. Hopkins,
ATTORNEY.

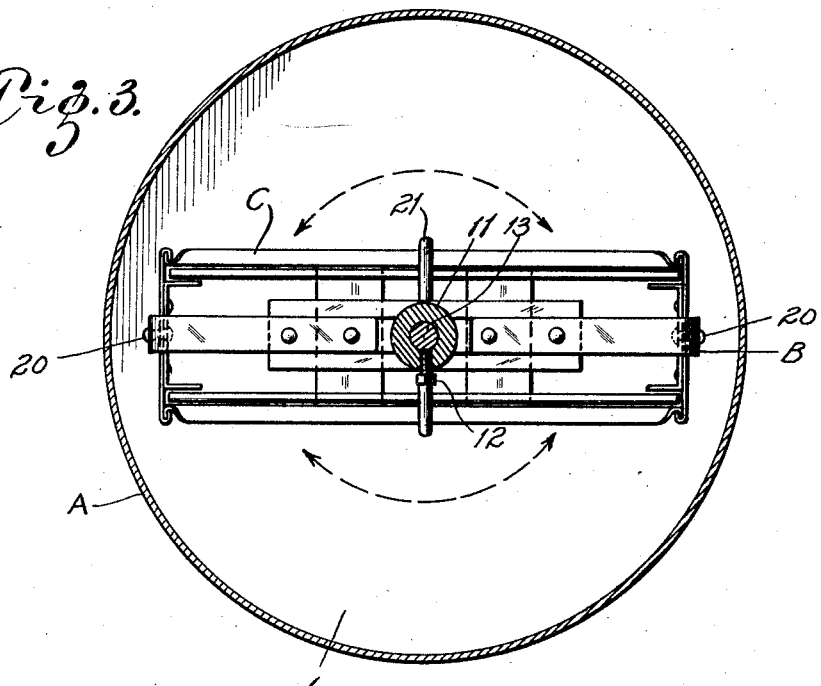
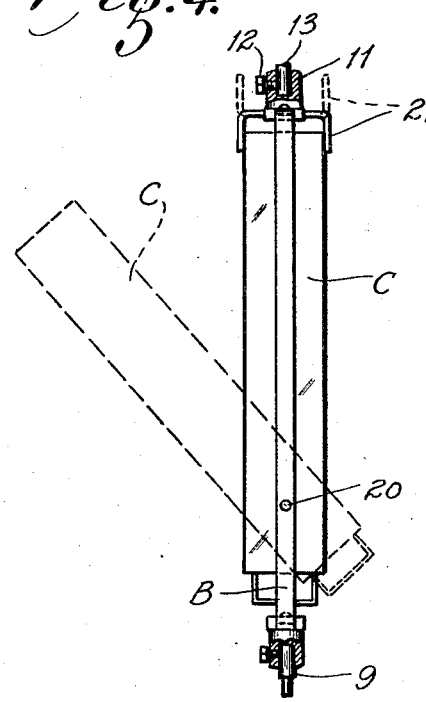
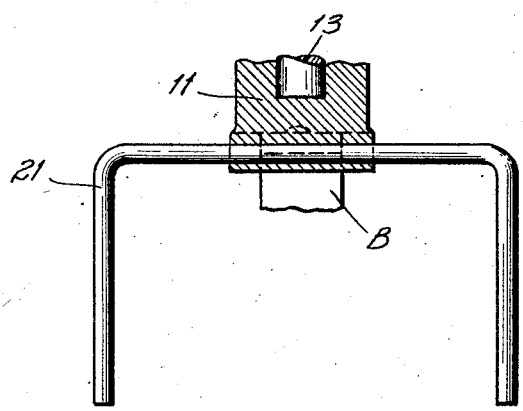

Patented Dec. 11, 1928.

1,694,541

UNITED STATES PATENT OFFICE.

GEORGE Y. HARRY, OF WAPAKONETA, OHIO.

HONEY EXTRACTOR.

Application filed September 3, 1927. Serial No. 217,513.

My invention relates to improvements in honey extractors, and has for its object to provide a compact, hand-operated extractor employing but a single comb-holding frame, particularly devised for the use of the small beekeeper.

The single frame is actuated through suitable gearing, by a crank-handle, the rotation of which crank-handle in one direction will expel the honey content from one side of the comb held in said frame—accomplishing this result in approximately one minute and fifteen seconds, as determined by repeated experimentation. The honey having been so expelled from one side of the comb, the direction of rotation of the frame is reversed, and the expulsion of honey from the full side of the comb is accomplished in another period of approximately one minute and fifteen seconds; thus accomplishing the complete evacuation of the honey from the comb in about two and one-half minutes, when the emptied comb is returned to the hive.

To facilitate the introduction and removal of the comb within the comb-holding frame, I have mounted said frame pivotally in a vertical rack and provided a latch carried by the rack which serves to hold the frame and rack in alinement with each other during the operation of honey extraction; the opening of the latch permitting the frame to be tilted in either direction so that its open upper mouth may be presented to the free access of the hand of the operator.

To provide for the withdrawal from the extractor of the liquid honey, I have provided the container with a conoidal bottom, in the apex of which the said rack is mounted; and a suitable draw-off cock (preferably a gate-valve) is mounted through the outer wall of the container in alinement with the outer edge of said conoidal bottom. This construction greatly facilitates not only the withdrawal of the honey, but the cleansing of the container by subjecting its inner walls and bottom to the impact of a stream of cleansing fluid.

Drawings.

In the drawings:—

Fig. 1 is a top plan view of a device embodying my invention.

Fig. 2 is a transverse mid-sectional view of the same taken on the line 2—2 of Fig. 1.

Fig. 3 is a transverse sectional view of the same taken on the line 3—3 of Fig. 2.

Fig. 4 is a side elevation of the rack with the comb-carrying frame in place, and indicating a tilted position of the frame in dotted lines.

Fig. 5 is an enlarged detailed view of the latch whereby the frame is locked in alinement with the rack.

Description.

In the drawings I have indicated the container A as being cylindrical in form, though it may be of any form desired. The container A is provided with the conoidal bottom 6, and a gate-valve 7, controlled by the valve handle 8, and mounted through the outer wall of the container A in alinement with the outer edge of said conoidal bottom 6. A rack B is provided at its bottom with a pintle 9 mounted in alinement with the apex of the conoidal bottom 6 and in the ball-bearing cup 10 (see Fig. 2). At its top, the rack B is provided with the socket 11, having the setscrew 12 for the reception of the stub shaft 13; which stub shaft 13 extends upwardly through the cross bar D.

The cross bar D carries the driving mechanism consisting of the intermeshing bevel-gears 14—15 which are actuated by the crank 16 and handle 17.

The cross bar D is removably mounted on top of the container A by means of the bolts 18—18 so that by the removal of the nuts 19—19, the cross bar D with the entire mechanism carried thereby, may be removed from the container A.

The comb-carrying frame C is pivotally mounted in the rack B by means of pins 20—20 and the rack B is provided at its top with the latch 21 shown in enlarged detail in Fig. 5; the latch 21, when closed, serving to hold the frame C in alinement with the rack B and when opened, to release the frame C to be tilted in either direction with reference to the rack B as shown by dotted lines in Fig. 4, and this for the purpose of permitting the frame C to be filled with honey comb and to permit the removal of the honey comb when the honey has been extacted from said comb by centrifugal force.

Mode of operation.

The frame C being filled with honey comb is rotated in one direction by the manipulation of the handle 17, with the effect of discharging the honey from the one side of the frame C, this operation requiring approximately one minutes and fifteen seconds. This result having been accomplished, the handle 17 is rotated in the opposite direction for a similar length of time with the effect of discharging the honey from the other side of the rack C.

The comb thus being completely emptied the latch 21 is opened to permit the tilting of the frame C as illustrated in Fig. 4 and the emptied comb is withdrawn by the hand of the operator and replaced in the hive. This cycle of operations is continued until the supply of honey in the comb is exhausted.

When it is desired to cleanse the entire apparatus, the nuts 19—19 are removed, the cross bar D, with its attached mechanism is withdrawn from the container A and the interior of the container A is cleansed by a stream of fluid injected therein, the gate-valve 7 being opened to permit the ejection of the cleansing fluid.

I am aware that heretofore honey has been removed from the comb by exteriors in which a plurality of comb-carrying frames have been employed, said plurality of frames being suitably mounted in a revolvable rack, the frames being reversed side for side in said rack and the extraction of the honey from the comb being accomplished by centrifugal force. Such is not my invention, my invention being directed to the production of the simple and inexpensive but effective mechanism employing a single comb-carrying frame mounted in a single rack, that rack being rotated on its own axis and reversal of direction of the rack serving to reverse the effective action of the frame without any disturbance of the relationship between the rack and the frame.

Variations of structure may be accomplished without departure from my actual invention as defined by the appended claims.

I claim:

1. In a honey extractor a rotatable rack; a comb-holding frame pivotally mounted in said rack; and a latch mounted in said rack and arranged to hold said frame in alinement with said rack; with means for rotating said rack.

2. In a honey extractor a rotatable rack; a comb-holding frame pivotally mounted in said rack; and a latch mounted in said rack and arranged to hold said frame in alinement with said rack; with means for rotating said rack in either direction.

3. In a honey extractor a rotatable rack; a comb-holding frame pivotally mounted in said rack and tiltable toward either side of said rack; and a latch mounted in said rack and arranged to hold said frame in alinement with said rack; with means for rotating said rack in either direction.

4. The improved honey extractor comprising a container; a single rotatable comb-holder vertically mounted in said container; and means permitting the tilting of said comb-holder from its vertical position; with means for rotating said comb-holder in opposite directions.

In testimony whereof I have hereunto affixed my signature.

GEORGE Y. HARRY.